United States Patent

Vogler et al.

(10) Patent No.: US 9,497,608 B2
(45) Date of Patent: Nov. 15, 2016

(54) APPARATUS AND METHOD FOR TRIGGERING AN EMERGENCY CALL IN A MOTOR VEHICLE

(71) Applicant: Volkswagen Aktiengesellschaft, Wolfsburg (DE)

(72) Inventors: Martin Vogler, Berlin (DE); Mirko Junge, Hildesheim (DE); Michael Fichte, Espelkamp (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 14/524,575

(22) Filed: Oct. 27, 2014

(65) Prior Publication Data

US 2015/0044982 A1    Feb. 12, 2015

Related U.S. Application Data

(63) Continuation of application No. PCT/EP2013/055360, filed on Mar. 15, 2013.

(30) Foreign Application Priority Data

Apr. 26, 2012    (DE) .......... 10 2012 008 382

(51) Int. Cl.
*H04M 11/04* (2006.01)
*H04W 4/22* (2009.01)
*G08B 25/01* (2006.01)
*G08B 25/00* (2006.01)
*G08B 29/18* (2006.01)

(52) U.S. Cl.
CPC .............. *H04W 4/22* (2013.01); *G08B 25/016* (2013.01); *G08B 25/001* (2013.01); *G08B 29/18* (2013.01)

(58) Field of Classification Search
None
See application file for complete search history.

(56) References Cited

U.S. PATENT DOCUMENTS

| | | | |
|---|---|---|---|
| 5,497,149 A | | 3/1996 | Fast |
| 5,584,052 A | * | 12/1996 | Gulau et al. ............... 455/79 |
| 6,067,345 A | * | 5/2000 | Sasaki ................ H04M 11/04 379/33 |
| 6,574,463 B1 | | 6/2003 | Yoshioka |
| 6,617,979 B2 | | 9/2003 | Yoshioka |
| 7,580,697 B2 | | 8/2009 | Lappe et al. |
| 2004/0091085 A1 | * | 5/2004 | Suganuma et al. ........... 379/45 |
| 2008/0122592 A1 | * | 5/2008 | Shimizu ................ 340/425.5 |
| 2009/0189754 A1 | * | 7/2009 | Hochrein ............ G08G 1/162 340/436 |
| 2010/0130161 A1 | * | 5/2010 | Stahlin et al. ........... 455/404.1 |

FOREIGN PATENT DOCUMENTS

| | | |
|---|---|---|
| CN | 200969139 Y | 10/2007 |
| CN | 102303608 A | 1/2012 |

(Continued)

*Primary Examiner* — Suhail Khan
(74) *Attorney, Agent, or Firm* — Barnes & Thornburg LLP

(57) ABSTRACT

An apparatus and a method for triggering an emergency call in a motor vehicle, wherein the apparatus has at least one module for setting up communication with a device outside the vehicle, wherein at least one evaluation device is assigned to the module, wherein the module automatically transmits an emergency call when at least one predefined state or event is detected, wherein the module is assigned a manual emergency call button which is connected to the module via at least one connecting line, wherein the module checks the at least one connecting line, wherein the module automatically transmits an emergency call when a defect in the at least one connecting line is detected.

19 Claims, 2 Drawing Sheets

(56) References Cited

FOREIGN PATENT DOCUMENTS

| DE | 101 21 076 A1 | 3/2001 |
| DE | 101 55 550 C1 | 10/2003 |
| DE | 102 30 482 A1 | 1/2004 |
| DE | 101 37 670 B4 | 1/2007 |
| DE | 10 2006 048 161 A1 | 4/2008 |
| DE | 10 2008 038 492 A1 | 2/2009 |
| DE | 10 2009 012 628 A1 | 9/2010 |
| EP | 2 230 652 A1 | 9/2010 |
| RU | 2 277 264 C2 | 5/2006 |
| WO | WO 2009/024581 A1 | 2/2009 |

* cited by examiner

APPARATUS AND METHOD FOR TRIGGERING AN EMERGENCY CALL IN A MOTOR VEHICLE

This nonprovisional application is a continuation of International Application No. PCT/EP2013/055360, which was filed on Mar. 15, 2013, and which claims priority to German Patent Application No. 10 2012 008 382.3, which was filed in Germany on Apr. 26, 2012, and which are both herein incorporated by reference.

BACKGROUND OF THE INVENTION

1. Field of the Invention

The invention relates to an apparatus and a method for triggering an emergency call in a motor vehicle.

2. Description of the Background Art

Motor vehicle emergency call terminal devices equipped with an emergency telephone unit are known in the art, whereby the emergency telephone unit establishes a call connection to an emergency center via a base station of a typical telecommunications network. Vehicle emergency call terminal devices are generally divided into two types: in the first type, an emergency button is pressed manually to output a call signal and in the second type a call signal is automatically output as a reaction to an output signal of an airbag sensor or a collision sensor. Some of the vehicle emergency call terminal devices of the first type are made to detect an unintended disconnection of a signal line from the emergency button, which results in the formation of an open electric circuit or a break in the electric circuit. In particular, terminal devices of this type comprise a control circuit, which monitors the pressing of the emergency button and an interruption of the signal line to the emergency button for performing the necessary operations. The connection of the emergency button to the control circuit is made via a switch when the emergency button is pressed.

DE 100 21 076 C2, which corresponds to U.S. Pat. No. 6,574,463, discloses an emergency call terminal device, which comprises an emergency call circuit, responsive to a request signal, to output an emergency call signal to a preselected emergency center and an emergency call switch connected to the emergency call circuit, whereby the emergency call switch is designed to be switched to an on-state and an off-state, whereby, if the emergency call switch is brought into the on-state, the call request signal is provided to the emergency call circuit. Further, the emergency call terminal device has an operating state signal producing circuit, which produces a first, second, third, and fourth operating state signal, different in voltage level from one another, in order to enable the emergency call circuit to differentiate the on-state, the off-state, a failure caused by a circuit break, and a failure caused by a short circuit. In this regard, the first operating state signal is produced when the emergency call switch is in the on-state; the second operating state signal is produced when the emergency call switch is in the off-state; the third operating state signal is produced when the switching failure caused by the circuit break results from a formation of an open circuit of the emergency call circuit caused by a disconnection of the emergency call circuit from the emergency call switch; and the fourth operating state signal is produced when the failure caused by a short circuit results from a formation of a short circuit of the emergency call switch.

DE 10 2008 038 492 A1 discloses a device for automatically making an emergency call, whereby the triggering event is, for example, a signal from an acceleration sensor. In this case, it is provided further that, if an emergency is detected such as, e.g., by an acceleration sensor, the intent of making an emergency call is indicated acoustically, optically, and haptically. If this intent is not countered by the driver within a short time of, for example, 5 seconds (e.g., by pressing a button on the mobile telecommunications unit), then the emergency call is made. If this is a fault detection, the driver responds and the emergency call is not made. Due to this possibility of a response by the driver, a lower detection threshold for the automatic emergency call can be selected and thereby an emergency can be recognized more reliably.

DE 10 2009 012 628 A1 discloses an arrangement for sending an emergency call with a module, which is located in a vehicle and is indispensable or necessary for vehicle functions, and a mobile telephone transceiver integrated into the module necessary for vehicle functions, whereby the module necessary for vehicle functions is designed to activate an emergency call via the integrated mobile telephone transceiver. In this regard, the emergency call is triggered manually and/or automatically after a specific event occurs. It is disclosed further here that the module necessary for vehicle functions is connected via communication lines to other modules, necessary for vehicle functions, of the vehicle electronics, whereby the specific event for making an emergency call is an interruption in the communication lines to the module necessary for vehicle functions.

SUMMARY OF THE INVENTION

It is therefore an object of the invention to provide an apparatus and a method for triggering an emergency call in a motor vehicle, whereby an improved reliability can be achieved thereby.

In an embodiment, the apparatus for triggering an emergency call in a vehicle has at least one module for setting up communication with an off-vehicle device. For example, the module can be configured as a GSM module and the off-vehicle device can be a central or local emergency center. The module can be assigned at least one evaluation device, whereby the module automatically makes an emergency call when at least one predefined state or event is detected. The module is furthermore assigned a manual emergency call button, which is connected to the module via at least one connecting line, whereby the module has components for checking the at least one connecting line, whereby the module automatically makes an emergency call when a defect in the at least one connecting line is detected. It is assured thereby that this occurs automatically in cases of faults in the connecting line, when the setting up of a connection for a communication cannot be requested via the emergency call button. If therefore, the connecting line is disconnected, due to an accident, for example, an emergency call nevertheless occurs automatically. It can be provided in this case that typically an emergency call occurs only manually by operating the emergency call button and the emergency call occurs automatically only in the case of a defect in the connecting line. It can also be provided, however, that in the case of other states or events as well an emergency call is made automatically, for example, when an acceleration sensor detects a delay greater than a threshold value. These acceleration sensors can be part of an airbag control, for example.

In an embodiment, the emergency call button is placed in a roof module of the vehicle and at least one connecting line is run through, or on an A-pillar of the vehicle. The advantage of the arrangement in the roof module is the good accessibility for the vehicle operator and simultaneously for the passenger as well. However, particularly in underride accidents, it can occur that parts of the vehicle roof are sheared off. Because now, however, the connecting line is run at least partially through or on the A-pillar, it is disconnected in such a case, so that then the emergency call is made automatically. The connecting line thus acts simultaneously as a sensor for underride accidents.

In a further embodiment, a vehicle speed signal can be supplied to the module, whereby an automatic emergency call is made only at vehicle speeds above a limiting speed, which is, for example, between 5 to 15 km/h. Thus, the risk of a false triggering is reduced, e.g., in the case of dismantling of the emergency call button when the vehicle is stationary. It is conceivable, furthermore, to combine the speed signal with the signal of a seat occupancy sensor, so that in rear-end collisions, in contrast, an automatic emergency call occurs again.

In a further embodiment, the intent of automatically making an emergency call is signaled, whereby the automatic calling can be suppressed via at least one input. The risk of erroneous emergency calls is also reduced in this way. In this case, a time period is preferably specified within which the user can suppress the emergency call via the input. The time period can be, for example, between 3 to 15 seconds, particularly 5 or 10 seconds.

In a further embodiment, the apparatus comprises a display unit and/or a speech output unit, by means of which the intent of automatically making an emergency call is signaled. Alternatively or in addition, a haptic signaling can also occur.

In a further embodiment, the input can be configured as a button, control panel (e.g., an input field on a touch screen), and/or as a speech input device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
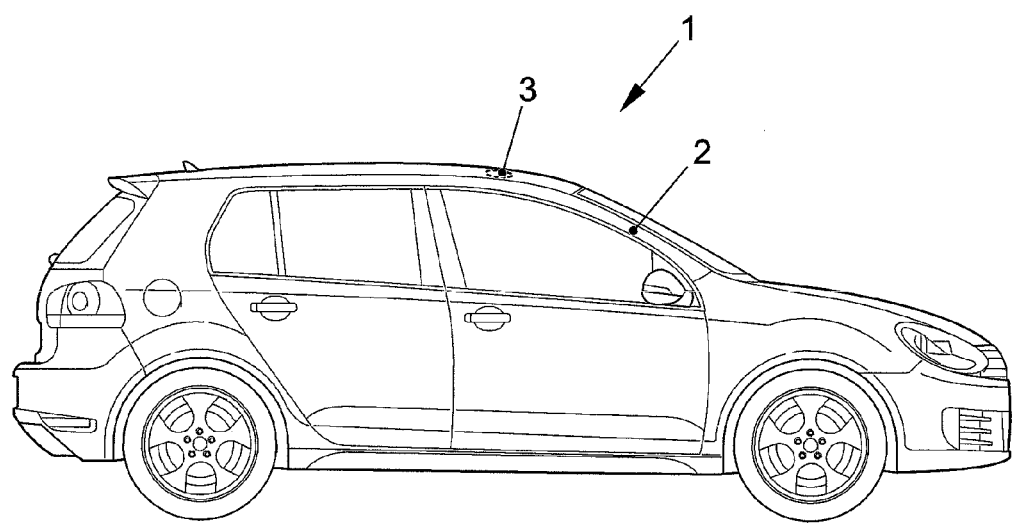
FIG. 1 shows a side view of a motor vehicle.

In FIG. 1, a motor vehicle 1 is shown in a side view. An A-pillar 2 can be seen as well as a roof module 3, whereby roof module 3 is shown as a dashed line, because it is integrated in a headliner from the vehicle interior.

Figure 2:
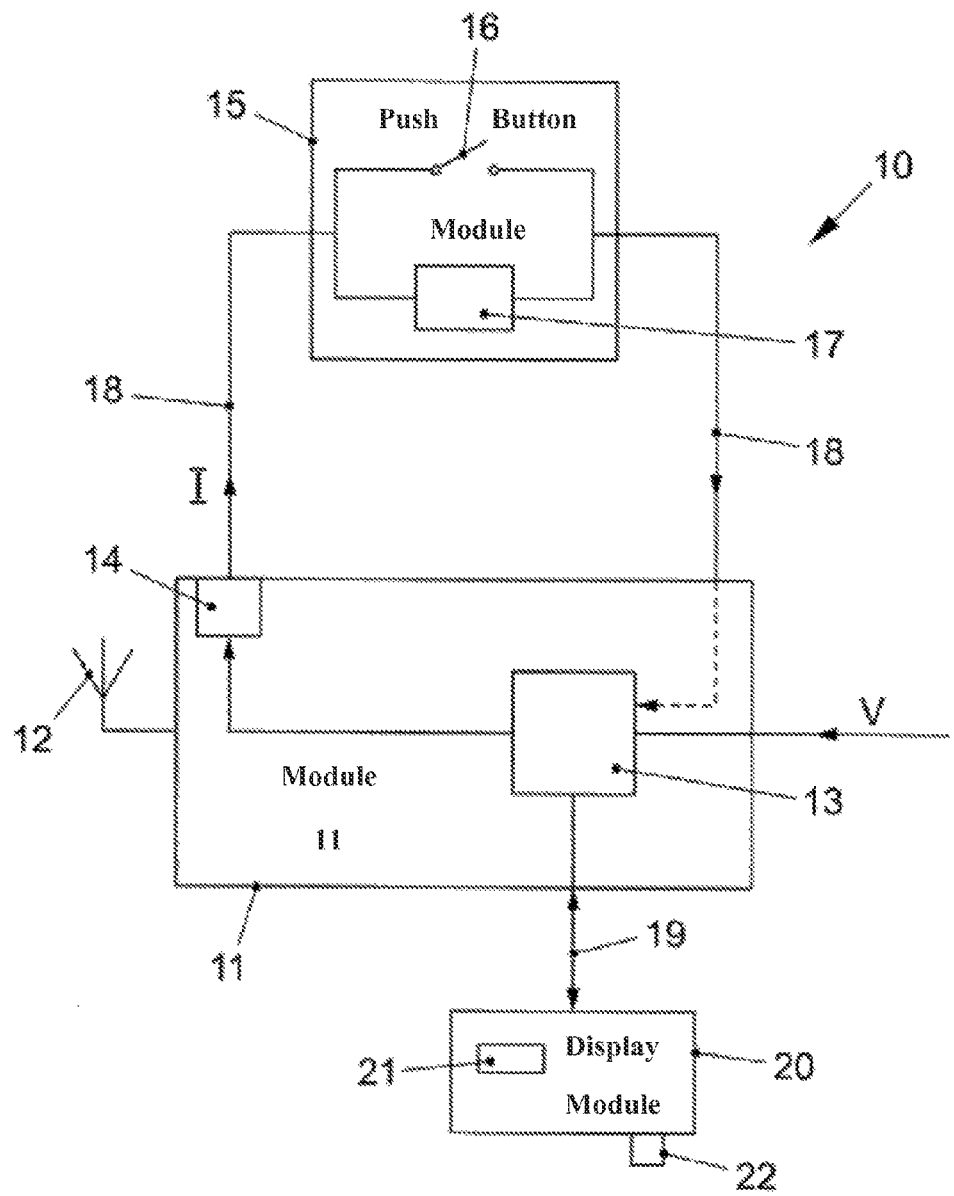
FIG. 2 shows a schematic block diagram of an apparatus for triggering an emergency call in a motor vehicle.

A block diagram of apparatus 10 for triggering an emergency call in a motor vehicle 1 (see FIG. 1) is shown in FIG. 2. Apparatus 10 comprises a module 11 for setting up communication with an off-vehicle device (not shown). Module 11 comprises an antenna 12, an evaluation device 13, and a voltage source 14. Further, apparatus 10 comprises a pushbutton module 15 with an emergency call button 16 and a diagnosis circuit 17, which is connected parallel to emergency call button 16. Diagnosis circuit 17 is, for example, a high-impedance resistor. Pushbutton module 15 is integrated into a roof module 3 of motor vehicle 1 (see FIG. 1). Module 11 and pushbutton module 15 are connected via connecting lines 18, which are run through A-pillar 2 (see FIG. 1). Further, module 11 is connected via a bus connection 19 to a display unit 20, on which a control panel 21 is displayed. Further display unit 20 is assigned a button 22. Finally, the vehicle speed V is sent to module 11, whereby this occurs preferably also via a bus connection such as, for example, a CAN bus connection.

A test voltage is applied between connecting lines 18 via voltage source 14, so that a test current I flows that is then evaluated in evaluation unit 13. As long as evaluation unit 13 detects test current I, connecting line 18 is working. If, in contrast, no test current I is detected, connecting line 18 is disconnected or has a short circuit to ground, whereby a short circuit to a supply voltage can be differentiated from the normal state because of an extremely high test current. When emergency call button 16 is actuated, the resistance is reduced, so that the test current I also increases but not as greatly as in the case of a short circuit to the supply voltage.

If an emergency situation now occurs, a vehicle operator can activate emergency call button 16. This is detected by evaluation unit 13 based on the increased test current I and a telecommunication connection is established over antenna 12 or a GSM module (not shown) and an emergency call is made.

If evaluation unit 13 now detects a defect in connecting line 18, evaluation unit 13 checks further whether the vehicle speed or a vehicle speed signal V is greater than a limiting speed $V_{limit}$ (e.g., 15 km/h). If this is the case, an emergency call is set up automatically by module 11. Evaluation unit 13 then transmits a message about the intended automatic emergency call to display unit 20. A text message, for example, is then superimposed on display unit 20, in which it is pointed out that an automatic emergency call will be transmitted in 10 seconds. The vehicle operator can then terminate the automatic emergency call by means of control panel 21. Alternatively or in addition, the vehicle operator can terminate or suppress the automatic emergency call by activating button 22. The remaining time until the emergency call is made can also be shown in the form of a countdown on display unit 20.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An apparatus for triggering an emergency call in a motor vehicle, the apparatus comprising:
   at least one module for setting up communication with an off-vehicle device, the module being assigned to at least one evaluation device, the module automatically making an emergency call when at least one predefined state or event is detected; and
   an emergency call button assigned and connected to the module via at least one connecting line,
   wherein the module checks the at least one connecting line,
   wherein the module automatically makes the emergency call when a defect in the at least one connecting line is detected, wherein the emergency call button is placed in a roof module of the motor vehicle, wherein the at least one connecting line is run through or on an A-pillar of the motor vehicle, wherein a vehicle speed signal is supplied to the module, and wherein the automatic emergency call is made only at a vehicle speed above a minimum speed.

2. The apparatus according to claim 1, wherein an intent of automatically making an emergency call is signaled, and wherein an automatic calling is suppressed via at least one input.

3. The apparatus according to claim 2, further comprising a display unit and/or a speech output unit, via which the intent of an automatic call is signaled.

4. The apparatus according to claim 2, wherein the input is configured as a button, control panel, and/or as a speech input device.

5. The apparatus according to claim 1, wherein the predefined defect state is a line disconnect.

6. The apparatus according to claim 5, wherein the line disconnect is detected by a break in a test voltage passing through the at least one connecting line.

7. The apparatus according to claim 5, wherein, upon detecting the predefined defect state, the module signals to the driver an intent to automatically make a call.

8. The apparatus according to claim 1, wherein the event is a collision or an airbag deployment.

9. The apparatus according to claim 1, wherein the emergency call button is accessible to a driver and a passenger of the motor vehicle.

10. The apparatus according to claim 1, wherein the minimum speed and the defect in the connecting line must be present for detection of the at least one predefined state or event.

11. The apparatus according to claim 1, wherein triggering of the manual emergency call button by a driver or passenger alone initiates the emergency call.

12. The apparatus according to claim 1, wherein the minimum speed is in a range of 5 to 15 kmh.

13. The apparatus according to claim 1, wherein the automatic emergency call is made only at the vehicle speed above the minimum speed and only after a specified time period.

14. The apparatus according to claim 13, wherein the specified time period is in a range of 3 to 15 seconds.

15. The apparatus according to claim 1, wherein the at least one predefined state or event is determined based on a test current.

16. The apparatus according to claim 15, wherein the at least one predefined state or event is detected based on a change in the test current.

17. A method for triggering an automatic emergency call in a motor vehicle by at least one module for setting up communication with an off-vehicle device, the method comprising:

assigning the module to at least one evaluation device;

automatically making by the module an emergency call when at least one predefined state or event is detected;

assigning the module a manual emergency call button that is connectable to the module via at least one connecting line;

checking, via the module, the at least one connecting line;

making the emergency call when a defect in the at least one connecting line is detected, wherein the emergency call button is placed in a roof module of the motor vehicle and the at least one connecting line is run through or on an A-pillar of the motor vehicle, wherein a vehicle speed level is supplied to the module, and wherein the automatic emergency call is made only at a vehicle speed above a minimum speed.

18. The method according to claim 17, wherein an intent of automatically making an emergency call is signaled, and wherein an automatic calling is suppressed via at least one input.

19. The method according to claim 17, wherein the at least one connecting line includes an open circuit in parallel with a diagnostic circuit.

* * * * *